(12) United States Patent
Smith et al.

(10) Patent No.: US 8,911,696 B1
(45) Date of Patent: Dec. 16, 2014

(54) RECYCLE PROCESS FOR ALKALINE AND CARBON ZINC BATTERIES

(71) Applicant: Retriev Technologies Incorporated, Anaheim, CA (US)

(72) Inventors: W. Novis Smith, Philadelphia, PA (US); James Applegate, Wilmington, DE (US)

(73) Assignee: Retriev Technologies Incorporated, Anaheim, CA (US)

( * ) Notice: Subject to any disclaimer, the term of this patent is extended or adjusted under 35 U.S.C. 154(b) by 0 days.

(21) Appl. No.: 14/248,754

(22) Filed: Apr. 9, 2014

(51) Int. Cl.
- *C01G 45/02* (2006.01)
- *C01G 9/02* (2006.01)
- *H01M 6/52* (2006.01)
- *H01M 4/50* (2010.01)
- *H01M 4/48* (2010.01)

(52) U.S. Cl.
CPC *H01M 6/52* (2013.01); *H01M 4/50* (2013.01); *H01M 4/48* (2013.01); *C01G 45/02* (2013.01); *C01G 9/02* (2013.01)
USPC ............. 423/50; 423/49; 423/99; 423/101; 429/49

(58) Field of Classification Search
CPC .................... C01G 45/02; C01G 9/02
USPC .......... 423/49, 50, 99, 101, 605, 622; 429/49
See application file for complete search history.

(56) References Cited

U.S. PATENT DOCUMENTS

| | | | |
|---|---|---|---|
| 4,401,463 A | 8/1983 | Melin et al. | |
| 5,352,270 A | 10/1994 | Shackle | |
| 8,586,218 B1 | 11/2013 | Smith et al. | |
| 8,728,419 B1 * | 5/2014 | Smith et al. | 423/50 |
| 2008/0317650 A1 | 12/2008 | Boren et al. | |

* cited by examiner

*Primary Examiner* — Brian Walck
(74) *Attorney, Agent, or Firm* — RatnerPrestia

(57) ABSTRACT

High purity MnO and zinc oxide may be efficiently recovered from alkaline and/or carbon zinc batteries using a process involving the treatment of the crushed batteries with an alkali hydroxide to produce insoluble manganese oxides and an alkali zincate solution. Zinc oxide is obtained by reacting the zinc solution with carbon dioxide or an acid such as a mineral acid and furnacing. The manganese oxides are converted to MnO by furnacing under an inert atmosphere.

23 Claims, No Drawings

RECYCLE PROCESS FOR ALKALINE AND CARBON ZINC BATTERIES

FIELD OF THE INVENTION

The invention pertains to processes for recycling alkaline and/or carbon zinc batteries, wherein the zinc present in such batteries may be recovered in the form of high purity zinc oxide and wherein the manganese present may be recovered in the form of high purity MnO.

BACKGROUND OF THE INVENTION

Currently, there is no commercially viable process for recycling and recovering the components used to manufacture alkaline and carbon zinc batteries, without resorting to the added incentive of the recycler being paid an additional fee for processing such batteries. There is, at present, a minimal amount of recycling of alkaline batteries wherein the zinc and manganese oxide mixtures recovered from such batteries are used as a supplement in animal feeds. No such recycling of carbon zinc batteries is performed, however. Only a small fraction of the alkaline batteries discarded each year are recovered in this way, with such processing only being practiced because of the processing fees paid.

About 85% by weight of all batteries is made up of these two types of disposable (non-rechargeable) batteries. The vast majority of such batteries are disposed of in landfills.

Carbon zinc batteries have a carbon rod as the cathode electrode, surrounded by manganese dioxide, with a zinc metal case for the anode. Alkaline batteries have a brass pin surrounded by zinc powder for the anode with manganese dioxide as the cathode and a steel case as the cathode electrode. An alkaline battery uses about 20% aqueous KOH as the electrolyte, while a carbon zinc battery uses aqueous ammonium chloride as the electrolyte. The relatively low value of the contents of these types of batteries has made it difficult for any recycled materials recovery process to be viable commercially. To date, it has been more cost effective to landfill these batteries, particularly the lower cost carbon zinc batteries, rather than recover the zinc and manganese from them.

SUMMARY OF THE INVENTION

A novel, low cost process has now been developed for recovering zinc as high purity zinc oxide, which maximizes the value of the zinc recovered from alkaline and carbon zinc batteries, and for recovering manganese as high purity manganese oxide (MnO) which is suitable for electrolytic production of manganese metal and manganese dioxide for direct use back into alkaline and carbon zinc batteries in almost quantitative yield. The steel and brass pins in such batteries are also recovered, thus completing the recycling of all metals contained therein. The inventive process is low cost with respect to the chemicals used and is labor and energy efficient. The development, in combination, of a process having low operating costs which achieves very efficient recovery of substantially all of the materials contained in such batteries in high purity enables this process to be commercially viable. Such process thus provides significant advantages as compared to landfilling these types of batteries and contributes to the sustainability of such batteries.

Accordingly, one aspect of the invention provides a process for recycling batteries, wherein the process comprises the steps of:

a) crushing batteries selected from the group consisting of alkaline batteries, carbon zinc batteries and combinations thereof to free electrode materials contained therein and to obtain crushed batteries comprised of fine electrode powders and pieces of coarser metal cases;

b) separating the fine electrode powders from the pieces of coarser metal cases;

c) reacting the fine electrode powders separated in step b) with alkali hydroxide in the presence of water to dissolve at least a portion of the zinc contained in the fine electrode powders to obtain a zincate solution in combination with insoluble manganese oxides;

d) separating the zincate solution from the insoluble manganese oxides;

e) reacting the zincate solution separated in step d) with at least one of carbon dioxide or acid to precipitate one or more insoluble zinc compounds (e.g., zinc oxide, zinc carbonate or a mixture thereof); and f) combining sulfuric acid with the insoluble manganese oxides separated in step d) to extract out residual zinc compounds and to obtain an acid-extracted manganese oxide product.

Following step f, a further step g1) may be carried out involving heating the acid-extracted manganese oxide product obtained in step f) at a temperature at or above 850° C. in a low oxygen atmosphere to form MnO. In one embodiment of the invention, the acid-extracted manganese oxide product from step f) is roasted at 350-400° C. to remove any volatile or corrosive impurities or traces of mercury in a distinct step prior to calcination at 850° C. or higher.

In another aspect of the invention, a further step g2) may be carried out wherein the acid-extracted manganese oxide product from step f) is isolated and reslurried in a base solution to a pH greater than 10 and then isolated to obtain $MnO_2$. The $MnO_2$ may be roasted to 200-400° C.

In another aspect of the process, step a) may be carried out using a water spray to obtain a slurry of the fine electrode powders and the pieces of coarser metal cases.

In another aspect, the alkali hydroxide may be sodium hydroxide.

In another aspect, the separation in step b) may be achieved using a screen, such as a 20 mesh screen for example.

In another aspect, following step b) and prior to step c) the fine electrode powders may be passed in the form of a slurry through a wet magnetic separator to remove any fine iron metal.

In another aspect, separation of the zincate solution from the insoluble manganese oxides in step d) may be carried out by filtration.

In another aspect, following step e) the precipitated one or more insoluble zinc compounds are recovered by filtration to obtain a filter cake, which may be calcined (furnaced) in a further step. High purity zinc oxide may be recovered following calcination.

In another aspect, step g) may be carried out in an inert atmosphere (e.g., a nitrogen atmosphere).

In another aspect, during step a) the crushed batteries may be present in the form of an aqueous slurry having a pH of greater than 8, e.g., from about 9.5 to about 10.5.

In another aspect, an amount of alkali hydroxide may be used in step c) which is effective to achieve a pH of greater than 14.

In another aspect, during step c) an oxygen-containing gas may be introduced to assist in oxidizing manganese compounds to $MnO_2$.

In another aspect, in step e) an amount of carbon dioxide and/or acid may be introduced which is effective to reduce the pH of the zincate solution to less than 12.

In another aspect, in step f) the insoluble manganese oxides may be slurried in water to form a slurry and an amount of sulfuric acid is combined with the slurry which is effective to achieve a pH of less than 3.

In another aspect, an acidic extract is obtained in step f) and the acidic extract may be treated with an amount of a base (e.g., alkali hydroxide) effective to precipitate zinc from the acidic extract.

Still further aspects of the invention provide zinc oxide product recovered by the aforementioned process as well as MnO product and $MnO_2$ product recovered by the aforementioned process.

In another aspect, an alkaline battery manufactured using the MnO product and/or $MnO_2$ product recovered by the aforementioned process is provided.

DETAILED DESCRIPTION OF CERTAIN EMBODIMENTS OF THE INVENTION

The process of the present invention may be practiced in accordance with the following procedures and variations thereof.

In a first step, the batteries (which may be exclusively alkaline batteries, exclusively carbon zinc batteries, or a combination of both types of batteries) may be fed through a crusher or shredder to open up the batteries and thereby liberate the electrode powders contained in the batteries. In one embodiment, a hammer mill with water spray is employed, although alternatively this step may be run dry. If only carbon zinc batteries are being processed, it will generally be desirable to practice the crushing step in a manner such that a slurry having a basic pH, e.g., a pH greater than 8 (such as a pH of from about 9.5 to about 10.5), is obtained as a result of the crushing, by adding an effective amount of an alkali hydroxide such as sodium hydroxide or potassium hydroxide. If only alkaline batteries are being processed, it usually will not be necessary to add alkali hydroxide because of the inherent alkalinity of such batteries. Alkali hydroxide addition may be practiced where a mixture of alkaline and carbon zinc batteries is being processed and the proportion of alkaline batteries relative to carbon zinc batteries is not sufficient to maintain the pH of the resulting slurry in the desired range or at the desired value.

The crushed batteries, which are typically in the form of an aqueous slurry, may then be deposited onto a shaker table or surface providing size separation (screening action). The coarser material containing almost all of the steel from the battery cases, the brass pins, separator materials and coarser case materials remain on the shaker table or screening device. The shaker table or screening device may have ¼" openings, for example. The finer electrode materials containing substantially all of the manganese oxides, carbon, zinc hydroxides, other zinc compounds, and any unreacted powdered zinc metal can be passed through a screen (e.g., a 20 mesh screen) to produce a basic slurry (typically having a pH greater than 9). Optionally, this basic slurry may be passed through a magnetic separator to remove any small pieces of steel which may still be present.

In a further step, the basic slurry may be dewatered (through a settling and decantation procedure, for example) and then treated with alkali hydroxide (e.g., 50% sodium hydroxide solution) to adjust the pH to greater than 14. This treatment dissolves at least a portion of the insoluble zinc metal and zinc compounds present in the slurry to form soluble zincate species (e.g., sodium zincate). The manganese oxide compounds present (e.g., $MnO_x$) remain substantially insoluble. The concentration of alkali hydroxide in the final slurry thereby obtained may be about 15% to about 30% by weight (in one embodiment, about 20% to about 25% by weight). An oxygen-containing gas such as air or oxygen may also be passed through the slurry to help oxidize substantially all of the manganese oxides present to $MnO_2$, which is essentially completely insoluble under these conditions. The temperature during this step is not believed to be critical, as temperature appears to have little effect on the rate of reaction.

The slurry thereby obtained may be filtered to separate the insoluble manganese oxides (e.g., $MnO_2$) from the zincate dissolved in solution, thereby yielding a manganese oxide filter cake and a filtrate which is a zincate solution. Alternatively, the slurry may be permitted to settle, with the liquid from the settled slurry then being decanted and polish-filtered to obtain a clear zincate solution. The zincate solution may then be transferred to a reactor or the like.

Carbon dioxide may be introduced into the zincate solution by sparging or other such operation. An acid, in particular a mineral acid such as sulfuric acid, hydrochloric acid, nitric acid or combinations thereof may be added to the zincate solution in neat, concentrated or diluted form. The carbon dioxide or acid reacts with the soluble zincate to form insoluble zinc compounds such as zinc oxide, zinc carbonate and admixtures thereof, which precipitate from solution. Generally, it will be desirable to introduce an amount of carbon dioxide and/or acid which is effective to reduce the pH of the zincate solution below 12, below 11 or preferably below 10.5.

The precipitated zinc compound(s) may be separated from the remaining liquid component of the reacted zincate solution by any suitable method or combination of methods such as filtration, decantation, centrifugation and the like. The separated zinc compounds) may be washed with water and/or may be subjected to repulping wherein the separated zinc compound solids are reslurried in one or more portions of water and then separated again from the supernatant liquid. The separated insoluble zinc compounds may be dried and/or calcined (e.g., heated at a temperature of from about 300° C. to about 450° C.), so as to convert any zinc carbonate or the like that may be present to zinc oxide. The zinc oxide which is recovered is typically of high purity; e.g., it may contain less than 0.5% by weight Mn.

The manganese oxide solids recovered from the filtration or decantation/filtration step may be slurried in water and combined with sulfuric acid. Alternatively, an aqueous sulfuric acid solution may be combined directly with the recovered manganese oxide solids. The sulfuric acid serves to extract any zinc remaining in the manganese oxide solids, thereby producing an acid-extracted manganese oxide product. Typically, an amount of sulfuric acid is used which is sufficient to achieve a pH below 3 (in one desirable embodiment, a pH less than 1.5) in the aqueous slurry of manganese oxide solids. The mixture of manganese oxide solids, sulfuric acid and water may be agitated or mixed by stirring, for example. The manganese oxide solids may be contacted with the sulfuric acid for a time and at a temperature effective to achieve a desired reduction in the zinc content of the manganese oxide solids. For example, such contacting may be carried out for about 1 to about 3 hours at a temperature of from about 50° C. to about 70° C. The further purified manganese oxide solids (acid-extracted manganese oxide product) may be separated from the sulfuric acid solution by any suitable method, such as filtration. If filtration is used, the resulting filter cake may be washed. The pH of the acidic extract obtained as a result of the treatment with sulfuric acid may be adjusted, through the addition of a base such as an alkali hydroxide, to a pH of about 9 to about 10 to precipitate the extracted zinc as well as the extracted manganese that may be present in the acidic extract. The precipitate may be collected by filtration or the like and then cycled back to the initial alkali hydroxide treatment step.

The separated manganese oxide solids separated from the sulfuric acid solution may thereafter be furnaced under a low oxygen atmosphere at a temperature of 850° C. or greater to convert the $MnO_2$ to MnO. For example, the low oxygen atmosphere may be an inert atmosphere, e.g., a nitrogen atmosphere. In one embodiment, the low oxygen atmosphere used contains less than 5% $O_2$ by volume. The furnacing temperature may be about 900° C., for example. Prior to furnacing under the low oxygen atmosphere, the acid-extracted manganese oxide product may be subjected to a distinct initial step wherein it is first roasted at 350-400° C. prior to heating to the furnacing temperature (850° C. or greater). This initial roasting step may be carried out under conditions effective to remove any volatile or corrosive impurities or traces of mercury. The product obtained by furnacing may be cooled under an inert atmosphere to protect it from re-oxidation. This product may be subsequently packaged and shipped to a customer, who may use it to manufacture new batteries, thereby completing the recycle process.

The manganese oxide solids prior to furnacing may contain some graphite carbon derived from the batteries; this carbon aids in the conversion of the $MnO_2$ to MnO.

The MnO recovered by practice of the process of the present invention is suitable, for example, for reacting with sulfuric acid to form a solution of manganous sulfate for use in electrolytic cells in manufacturing $MnO_2$ (EMD—electrolytic manganese dioxide for alkaline batteries).

The coarser material (e.g., 20+ mesh) which is separated from the initial crushed batteries may be dried and passed through a magnetic separator to recover clean steel particles, which can then be recycled (to steel mills, for example).

$MnO_2$ (in particular, gamma manganese dioxide) may be obtained from the acid-extracted manganese oxide product by a procedure involving treatment with an aqueous solution containing base. For example, the acid-extracted manganese oxide product may be isolated (by filtration to provide a filter cake, for example) and reslurried in water. An amount of a base such as an alkali hydroxide (e.g., sodium hydroxide, potassium hydroxide) may then be combined with the reslurried acid-extracted manganese oxide product which is effective to increase the pH to a value greater than 10 (e.g., a pH of at least 11 or a pH of about 12). The solids present in the slurry may then be isolated by filtration or other such separation technique to obtain $MnO_2$. The $MnO_2$ may be dried by heating (roasting) at a temperature of 200-400° C. The $MnO_2$ thereby obtained is suitable for use in manufacturing alkaline batteries.

EXAMPLES

Example 1

245 kilograms of used alkaline batteries (primarily AA size) were wet crushed in a hammer mill, reducing the average diameter to less than ½ inch. The crushed batteries were screened through 20 mesh screen to separate the +20 mesh material consisting of 95 kg of large steel, plastic and iron particles from the −20 mesh slurry of manganese and zinc. The slurry of manganese- and zinc-containing particles was passed through a magnetic separator to remove 2 kg of fine iron particles.

The iron-free slurry of zinc and manganese particles (145 kg) in water was allowed to settle in a 500 gal. reactor, and the water layer decanted off. Additional water was added to fill the reactor, then repulped to achieve about 15% solids, settled, and the water decanted off. 196 kg of 50% sodium hydroxide and 196 kg of water were added to the stirred concentrated slurry to form a resulting 25% by weight sodium hydroxide concentration. The slurry heated up due to the dilution of the sodium hydroxide with some bubbling from residual zinc metal present. This slurry was stirred for 2 hours to solubilize about 75% of the zinc as sodium zincate. The concentrated slurry was settled and the liquid layer filtered to remove any particulate. The zincate filtrate was added to a second reactor for zinc oxide precipitation. The settled extracted manganese oxide layer in the first reactor was repulped with an equal volume of water and again allowed to settle and the water layer decanted into the second reactor containing the zincate solution. Carbon dioxide was run into this zincate solution as rapidly as possible until the pH dropped from 14 down to 11 and then stopped. The white slurry was stirred 1 hr at 70° C. and then allowed to settle, and the liquid layer was decanted off. Water was added and the white zinc-containing layer repulped at 70° C., settled and the water layer decanted off again. A final addition of water was then made and the slurry heated to 70° C. and then filtered to produce a white cake. The filter cake of zinc oxide was run through a calciner at 350-380° C. to produce 43 kg of ZnO containing less than 0.10% Mn, which is suitable for sale.

Water was added to the repulped settled manganese oxide layer from the base extraction in the first tank to produce a slurry containing about 15% solids and stirred. 80 kg of 93%+ sulfuric acid was added until the pH was 1.0 and then was allowed to mix for 2 hours at 60° C. The material was then isolated by filtration, washed and dried for a final weight of 110 kg. This cake was dried at 70° C. for 12 hours in air to remove any remaining moisture. The dried cake was furnaced through a rotary calciner at 900° C. under a nitrogen environment with a 30 minute retention time to reduce the manganese oxides to MnO. The 82 kg of green MnO was cooled below 100° C. in the nitrogen environment before packaging. X-ray diffraction showed only MnO and 4-8% carbon were present.

The filtrate from the acid extraction was added to a third reactor and 50% sodium hydroxide added to pH 10 to precipitate the zinc as zinc hydroxide/sulfate along with some $MnO_x$. This slurry was filtered to produce about 15 kg of damp cake, which was combined with the initial slurry solids for the next base extraction run in the first reactor.

Example 2

205 kilograms of used alkaline batteries (primarily AA size) were wet crushed in a hammer mill, reducing average diameter to less than ½ inch. The crushed batteries were screened through a 20 mesh screen to separate the +20 mesh material consisting of 80 kg of large steel, plastic and iron particles from the −20 mesh slurry of manganese and zinc. The slurry of manganese- and zinc-containing particles was passed through a magnetic separator to remove 1.5 kg of fine iron particles into a reactor.

The iron-free slurry of zinc and manganese particles (122 kg) in water was allowed to settle in a reactor, and the water layer decanted off. Additional water was added to the settled particulate layer and repulped to form a slurry of about 15% solids. 164 kg of 50% sodium hydroxide were added to the stirred concentrated slurry to form a resulting 25% by weight sodium hydroxide concentration. The slurry heated up due to the dilution of the sodium hydroxide with some bubbling from residual zinc metal present. This slurry was stirred for 2 hours to solubilize about 75% of the zinc as sodium zincate. The concentrated slurry was settled and the liquid layer filtered to remove any particulate. The zincate filtrate was added to a second reactor for zinc oxide precipitation. The settled extracted manganese oxide layer in the first reactor was repulped with an equal volume of water and again allowed to settle and the water layer decanted into the second reactor containing the zincate solution. Carbon dioxide was run into this zincate solution as rapidly as possible until the pH dropped from 14+ down to 11 and then stopped. The white slurry was stirred 30 minutes and maintained at 70° C. and then allowed to settle. The water layer was decanted off and a volume of water equal to twice the volume of the settled layer was added to the white settled layer of zinc oxide which was repulped, heated, and stirred to 70° C. and then allowed to settle. The water layer was decanted off. Again water was added to the settled zinc oxide and repulped at 70° C. and then filtered. The filter cake of zinc oxide/carbonate was run through a calciner at 350-380° C. to produce 36 kg of ZnO containing less than 0.15% Mn, which is suitable for sale.

Water was added to the repulped settled manganese oxide layer from the base extraction in the first tank to produce about 15% solids slurry and stirred. 71 kg of 93%+ sulfuric acid was added until the pH was 1.0 and then was allowed to mix for 2 hours at 60° C. The material was then filtered, washed and dried at 70° C. for 12 hours in air to remove any remaining moisture. The dried cake was furnaced at 900-° C. in an $N_2$ environment for 30 minutes to reduce the manganese oxides to MnO. The 69 kg of green MnO was cooled below 100° C. in the nitrogen environment before packaging. X-ray diffraction showed only MnO and 4-8% carbon were present.

The filtrate from the acid extraction was added to a third reactor and 50% sodium hydroxide added to pH 10 to precipitate the zinc as zinc hydroxide/sulfate along with some $MnO_x$. This slurry was filtered to produce about 12 kg of damp cake, which was combined with the initial slurry solids for the next base extraction run.

Example 3

220 kilograms of used alkaline batteries (primarily AA size) were wet crushed in a hammer mill, reducing the average diameter to less than ½ inch. The crushed batteries were screened through 20 mesh screen to separate the +20 mesh material consisting of 85 kg of large steel, plastic and iron particles from the −20 mesh slurry of manganese and zinc. The slurry of manganese- and zinc-containing particles was passed through a magnetic separator to remove 1.9 kg of fine iron particles.

The iron-free slurry of zinc and manganese particles (131 kg) in water was allowed to settle in a 500 gal. reactor, and the water layer decanted off. Additional water was added to fill the reactor, then repulped to achieve about 15% solids, settled, and the water decanted off. 176 kg of 50% sodium hydroxide and 176 kg of water were added to the stirred concentrated slurry to form a resulting 25% by weight sodium hydroxide concentration. The slurry heated up due to the dilution of the sodium hydroxide with some bubbling from residual zinc metal present. This slurry was stirred for 2 hours to solubilize about 75% of the zinc as sodium zincate. The concentrated slurry was settled and the liquid layer filtered to remove any particulate. The zincate filtrate was added to a second reactor for zinc oxide precipitation. The settled extracted manganese oxide layer in the first reactor was repulped with an equal volume of water and again allowed to settle and the water layer decanted into the second reactor containing the zincate solution. Sulfuric acid was run into this zincate solution until the pH dropped from 14 down to 11 and then stopped. The white slurry was stirred 1 hr at 70° C. and then allowed to settle, and the liquid layer was decanted off. Water was added and the white zinc-containing layer repulped at 70° C., settled and the water layer decanted off again. A final addition of water was then made and the slurry heated to 70° C. and then filtered to produce a white cake. The filter cake of zinc oxide/zinc carbonate was run through a calciner at 350-380° C. to produce 39 kg of ZnO containing less than 0.10% Mn, which is suitable for sale.

Water was added to the repulped settled manganese oxide layer from the base extraction in the first tank to produce a slurry containing about 15% solids and stirred. 72 kg of 93%+ sulfuric acid was added until the pH was 0.8 and then was allowed to mix for 2 hours at 60° C. The material was then filtered, washed and dried for a final weight of 99 kg. This cake was dried at 70° C. for 12 hours in air to remove any remaining moisture. The dried cake was furnaced through a rotary calciner at 900° C. under a nitrogen environment with a 30 minute retention time to reduce the manganese oxides to MnO. The 74 kg of green MnO was cooled below 100° C. in the nitrogen environment before packaging. X-ray diffraction showed only MnO and 4-8% carbon were present.

The filtrate from the acid extraction was added to a third reactor and 50% sodium hydroxide added to pH 10 to precipitate the zinc as zinc hydroxide/sulfate along with some $MnO_x$. This slurry was filtered to produce about 15 kg of damp cake, which was combined with the initial slurry solids for the next base extraction run in the first reactor.

Example 4

400 g of the acid-extracted manganese oxide cake from Example 3 were dried at 400° C. to produce a manganese oxide cake containing 58% Mn; 6% carbon; 0.8% Zinc and <0.5 ppm Hg (non-detected). This manganese oxide was subsequently calcined at 900° C. to produce green MnO with 72% Mn.

Example 5

400 g of the acid-extracted manganese oxide cake from Example 3 was slurried in 1000 mL of water and 40% KOH solution was added until the pH of the slurry was stable at 12. The slurry was filtered and dried at 250° C. to produce a gamma manganese dioxide cake containing 58% Mn; 6% carbon; 0.5% Zinc and <0.5 ppm Hg (non-detected). This $MnO_2$ is suitable for use as the cathode material in an alkaline, carbon zinc or primary lithium metal battery.

What is claimed is:

1. A process for recycling batteries, comprising the steps of:
   a) crushing batteries selected from the group consisting of alkaline batteries, carbon zinc batteries and combinations thereof to free electrode materials contained therein and to obtain crushed batteries comprised of fine electrode powders and pieces of coarser metal cases;
   b) separating the fine electrode powders from the pieces of coarser metal cases;
   c) reacting the fine electrode powders separated in step b) with alkali hydroxide in the presence of water to dissolve at least a portion of the zinc contained in the fine electrode powders to obtain a zincate solution in combination with insoluble manganese oxides;

d) separating the zincate solution from the insoluble manganese oxides;

e) reacting the zincate solution separated in step d) with at least one of carbon dioxide or an acid to precipitate zinc oxide; and f) combining sulfuric acid with the insoluble manganese oxides separated in step d) to extract out residual zinc compounds and to obtain an acid-extracted manganese oxide product.

2. The process of claim 1, comprising an additional step g1) of heating the acid-extracted manganese oxide product obtained in step f) at a temperature at or above 850° C. in a low oxygen atmosphere containing less than 5% $O_2$ by volume to form MnO.

3. The process of claim 1, wherein step a) is carried out using a water spray to obtain a slurry of the fine electrode powders and the pieces of coarser metal cases.

4. The process of claim 1, wherein the alkali hydroxide is sodium hydroxide.

5. The process of claim 1, wherein the separation in step b) is achieved using a screen.

6. The process of claim 5, wherein the screen is a 20 mesh screen.

7. The process of claim 1, wherein following step b) and prior to step c) the fine electrode powders are passed in the form of a slurry through a wet magnetic separator to remove any fine iron metal.

8. The process of claim 1, wherein separation of the zincate solution from the insoluble manganese oxides in step d) is carried out by filtration.

9. The process of claim 1, wherein following step e) the precipitated one or more insoluble zinc compounds are recovered by filtration to obtain a filter cake.

10. The process of claim 9, comprising a further step of calcining the filter cake.

11. The process of claim 2, wherein step g1) is carried out in an inert atmosphere.

12. The process of claim 1, wherein during step a) the crushed batteries are present in the form of an aqueous slurry having a pH of greater than 8.

13. The process of claim 12, wherein the pH is from about 9.5 to about 10.5.

14. The process of claim 1, wherein an amount of alkali hydroxide is used in step c) which is effective to achieve a pH of greater than 14.

15. The process of claim 1, wherein during step c) an oxygen-containing gas is introduced to assist in oxidizing manganese compounds to $MnO_2$.

16. The process of claim 1, wherein in step e) an amount of carbon dioxide and/or acid is introduced which is effective to reduce the pH of the zincate solution to less than 12.

17. The process of claim 1, wherein in step f) the insoluble manganese oxides are slurried in water to form a slurry and an amount of sulfuric acid is combined with the insoluble manganese oxides which is effective to achieve a pH of less than 3.

18. The process of claim 1, wherein an acidic extract is obtained in step f) and the acidic extract is treated with an amount of a base effective to precipitate zinc species from the acidic extract.

19. The process of claim 1, wherein carbon dioxide is used in step e).

20. The process of claim 1, wherein at least one acid selected from the group consisting of sulfuric acid, hydrochloric acid and nitric acid is used in step e).

21. The process of claim 1, comprising an additional step g2) wherein the acid-extracted manganese oxide product from step f) is isolated and reslurried in a base solution to a pH greater than 10 and then isolated to obtain $MnO_2$.

22. The process of claim 21, wherein the $MnO_2$ is roasted to 200-400° C.

23. The process of claim 1, wherein the acid-extracted manganese oxide product from step f) is roasted at 350-400° C. to remove any volatile or corrosive impurities or traces of mercury in a distinct step prior to calcination at 850° C. or higher.

* * * * *